United States Patent [19]

Yamane et al.

[11] Patent Number: 4,873,756
[45] Date of Patent: Oct. 17, 1989

[54] MACHINE TOOL

[75] Inventors: Hisaaki Yamane; Noboru Hirose, both of Aichi, Japan

[73] Assignee: Brother Kogyo Kabushiki Kaisha, Aichi, Japan

[21] Appl. No.: 8,654

[22] Filed: Jan. 30, 1987

[30] Foreign Application Priority Data

Feb. 5, 1986 [JP] Japan .............................. 61-15270[U]
Feb. 7, 1986 [JP] Japan .................................. 61-26477
Feb. 7, 1986 [JP] Japan .............................. 61-16987[U]

[51] Int. Cl.$^4$ .......................................... B23Q 3/157
[52] U.S. Cl. ..................................... 29/568; 29/26 A; 408/35
[58] Field of Search .................. 29/26 A, 568; 408/35

[56] References Cited

U.S. PATENT DOCUMENTS

| | | | |
|---|---|---|---|
| 3,332,142 | 7/1967 | Lehmkuhl et al. | 29/568 |
| 3,704,510 | 12/1972 | Sedgwick et al. | 29/568 |
| 3,975,817 | 8/1976 | Frazier | 29/568 |
| 3,990,140 | 11/1976 | Polacek et al. | 29/568 |
| 4,679,296 | 7/1987 | Watanabe et al. | 29/568 |

FOREIGN PATENT DOCUMENTS 60-155338 8/1985 Japan .
1501933 2/1978 United Kingdom .
2132119 9/1983 United Kingdom .
2179278 3/1987 United Kingdom .
8702496 4/1987 United Kingdom .

Primary Examiner—Z. R. Bilinsky
Attorney, Agent, or Firm—Finnegan, Henderson, Farabow, Garrett, & Dunner

[57] ABSTRACT

A machine tool with a vertically reciprocating spindle head has an automatic tool changer including a rotatingly indexable tool support connected to the machine tool frame and vertically movable independently of the spindle head, a first cam-and-crank mechanism activated by spindle head vertical movement to move the tool support with the spindle head during a first portion of the tool changing operation and away from the spindle head during a second portion of the tool changing operation, a second cam-and-crank mechanism also activated by spindle head vertical movement for opening and closing a tool holder on the tool support during another portion of the tool changing operation, a tool holder with a pair of rotatably supported L-shaped fingers which hold a tool in a substantially perpendicular direction to the axes of finger rotation, a tool taking device for taking a tool out of a tool magazine, and a vertical stop for preventing vertical movement of the tool support with the spindle head into the machining region.

12 Claims, 12 Drawing Sheets

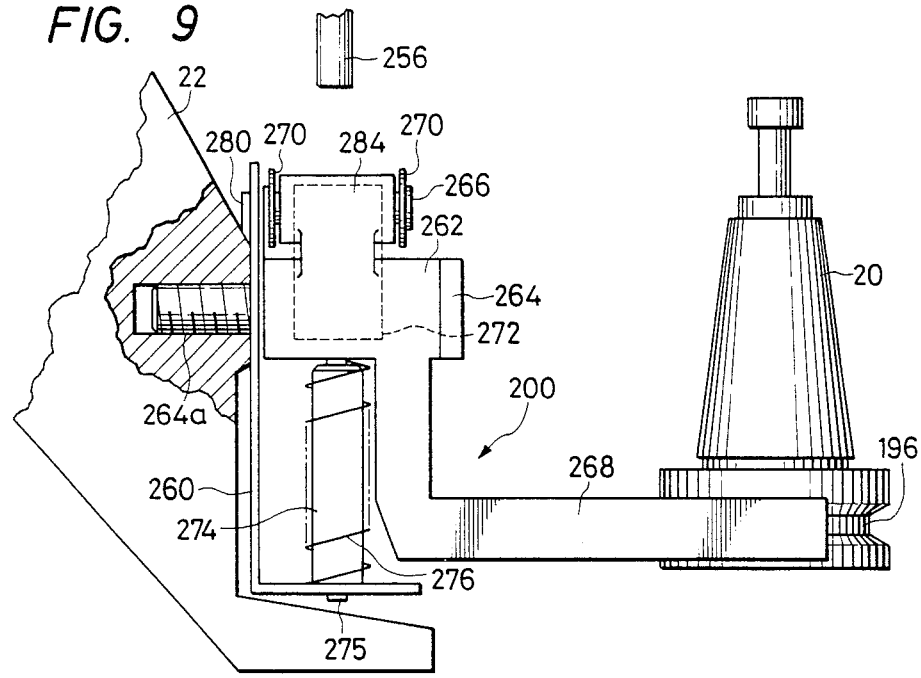
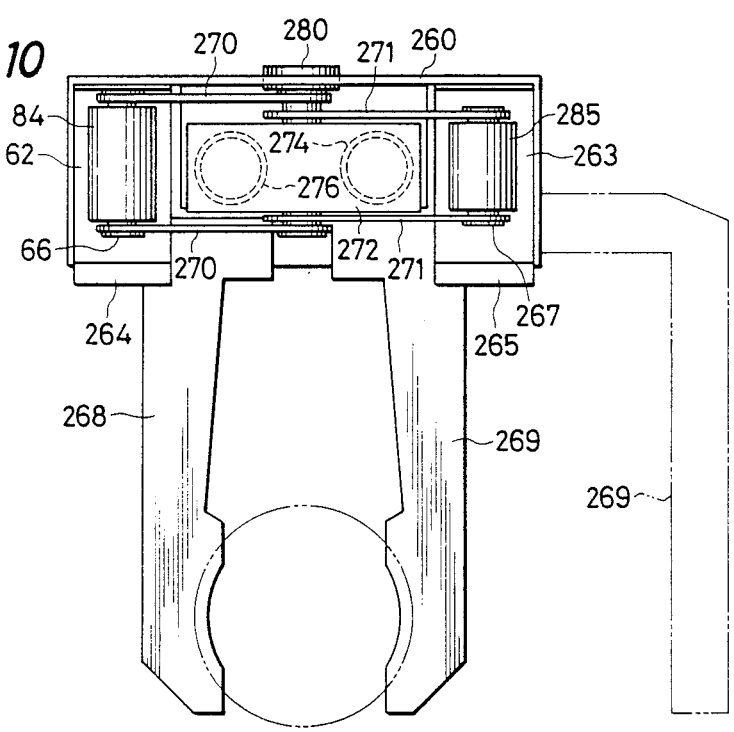

MACHINE TOOL

BACKGROUND OF THE INVENTION

1. Field of the Invention:

This invention relates to a machine tool and more particularly to a machine tool in which a plurality of tools in a tool magazine are selectively used to machine a workpiece. Copending U.S. application Ser. No. 768,750 has been filed on Aug. 23, 1985 now abandoned.

2. Description of the Prior Art:

A conventional machine tool of this type is often equipped with an automatic tool exchanging device in which a disk-shaped tool magazine, having a number of tools radially arranged, is rotatably mounted on a spindle, and the tool magazine is turned to index a desired tool. In such a machine tool, the tool exchanging operation is carried out as follows: The spindle head holds the tool magazine in place in the automatic exchange region which is located above the machining region of the spindle head, and the spindle head is returned relative to the tool magazine to a position where the tools in the tool magazine do not interfere with the spindle head. The tool magazine is then turned to index a desired tool and the spindle head is moved to connect this tool to the spindle.

In such a machine tool, a tool holding device is generally provided on the tool magazine to detachably hold tools. In one example of a conventional tool holding device, pairs of fingers are arranged linearly, arcuately, or radially at predetermined intervals in the peripheral portion of the tool magazine. Each pair of fingers is supported so as to be rotatable about an axis which is in parallel with the axis of a tool held by the fingers. The fingers are energized by springs or the like at the position at which they diametrically confront a tool. Thus, the tool is held in a direction perpendicular to its axis and the fingers are turned in the opposite direction to release the tool. For instance, in Japanese patent application early publication No. 155338/1985, a tool magazine with a plurality of radially arranged tools is turned to index a desired tool. After the desired tool is connected to the spindle, the pair of fingers which hold the tool are turned horizontally by a crank mechanism to release the tool. Then, the spindle head supporting the spindle is moved vertically through the gap between the fingers to machine the workpiece.

In a machine tool of this type, a conventional pair of fingers have a tool holding position in which the fingers are urged toward the tool and a tool releasing position where the fingers are urged away from the tool. Therefore, when it is desired to replace the tool, the operator directly opens the fingers to take the tool out of the tool magazine.

Several problems are inherent in a machine tool as described above. For instance, the tool exchanging operation is typically carried out by moving the spindle head relative to the tool magazine which is held at a predetermined position. Thus, the length of movement of the spindle head is necessarily large, i.e., the stroke of the spindle head is long. Therefore, the machine tool needs a space corresponding to the length of the movement of the spindle head. The machine tool, therefore, is liable to become very bulky. In addition, the tool exchanging operation takes a relatively long period of time which lowers the work efficiency of the machine tool.

In a machine tool of the above description in which the pairs of fingers are moved respectively in opposite directions perpendicular to the axis of the tool, the size of the spindle head must be increased to increase the finger opening angle. Thus, the fingers must be made longer in length and positioned further from the spindle head. This may lead to difficulties when adjacent pairs of fingers interfere with one another. Also, this results in a machine tool of increased size.

Another problem arising in the above-described machine tool is that the operator must manually open the fingers to take the tool out of the tool magazine. Thus, his finger or fingers may be injured by being caught between the tool and the tool holding fingers. In addition, it takes time and labor for the operator to take the tool out of the tool magazine.

SUMMARY OF THE INVENTION

The present invention is intended to eliminate the above-described difficulties accompanying a conventional machine tool with a tool magazine.

It is a specific object of the present invention to provide a machine tool which is small in size, short in tool exchanging time, and high in work efficiency.

It is another specific object of the present invention to provide a tool holding device for a machine tool in which each pair of fingers can be sufficiently widely opened at the tool releasing position without interfering with the adjacent pair of fingers.

It is a further specific object of the present invention to provide a tool taking device for a machine tool which makes it possible to readily and safely take tools out of the tool magazine.

In the machine tool according to the present invention, a main spindle head rotatable supports a spindle with a tool mount at one end. The spindle head is reciprocal relative to the machine tool frame in the axial direction of the main spindle. A tool holding member is installed in the tool mount of the main spindle. Automatic means are provided for changing a tool held in the tool holding member. A tool support is attached to the machine tool frame and is movable in the axial direction of the main spindle independent of the main spindle. A tool magazine is rotatably supported on, and axially movable with, the tool support. The tool magazine has a plurality of tool holders spaced on its periphery, each of the tool holders is capable of detachably holding a tool. The tool magazine indexes a selected tool holder into and out of axial alignment with the main spindle. A first cam-and-crank means interconnects the main spindle head, the frame, and the tool support for moving the tool support together with the main spindle head over a predetermined distance during "double action" movement of the main spindle head. The first cam-and-crank means also moves the tool support and the main spindle head away from each other by a predetermined distance during the "double action" movement. A second cam-and-crank mechanism interconnects the main spindle head and the frame to release the tool from the tool holding member during a preselected portion of the "double action" movement. The spindle head is axially movable below a fixed location for performing machining functions while the tool support is prevented from moving below the fixed axial location. Thus, the tool support and the tool magazine do not interfere with the workpiece during the machining process.

To achieve the foregoing objects, and in accordance with the purposes of the invention as embodied and broadly described herein, a tool holding device for a machine tool is provided with a pair of substantially L-shaped fingers. Each of the pair of fingers has a base end portion rotatably supported on a tool magazine and a free end portion formed into a clamping pawl. The pair of fingers has a tool holding position in which the clamping pawls hold a tool in a substantially perpendicular direction to the axes around which the fingers rotate. The pair of fingers also has a tool releasing position in which the clamping pawls release the tool. Finger operating means are provided to move the clamping pawls to the tool holding and tool releasing position.

To further achieve the foregoing objects, and in further accordance with the purposes of the invention as embodied and broadly described herein, a tool taking device is provided in which a support rod is rotatably supported on the tool support. A depressing lever extending from the middle of the support rod toward the fingers of a tool holder is operable to abut against the fingers. An operating lever, coupled to one end of the support rod located outside the periphery of the tool magazine, is operable to cause the depressing lever to abut the fingers and move them to a tool releasing position.

BRIEF DESCRIPTION OF THE DRAWINGS

FIG. 9 is an enlarged sectional view of the fingers in the second embodiment of the present invention;

FIG. 10 is a plan view showing the fingers in the second embodiment of the present invention;

PREFERRED EMBODIMENT OF THE INVENTION

Referring now to FIGS. 1-7, a preferred first embodiment of the present invention is the form of a machine tool will now be described in detail.

Figure 1:
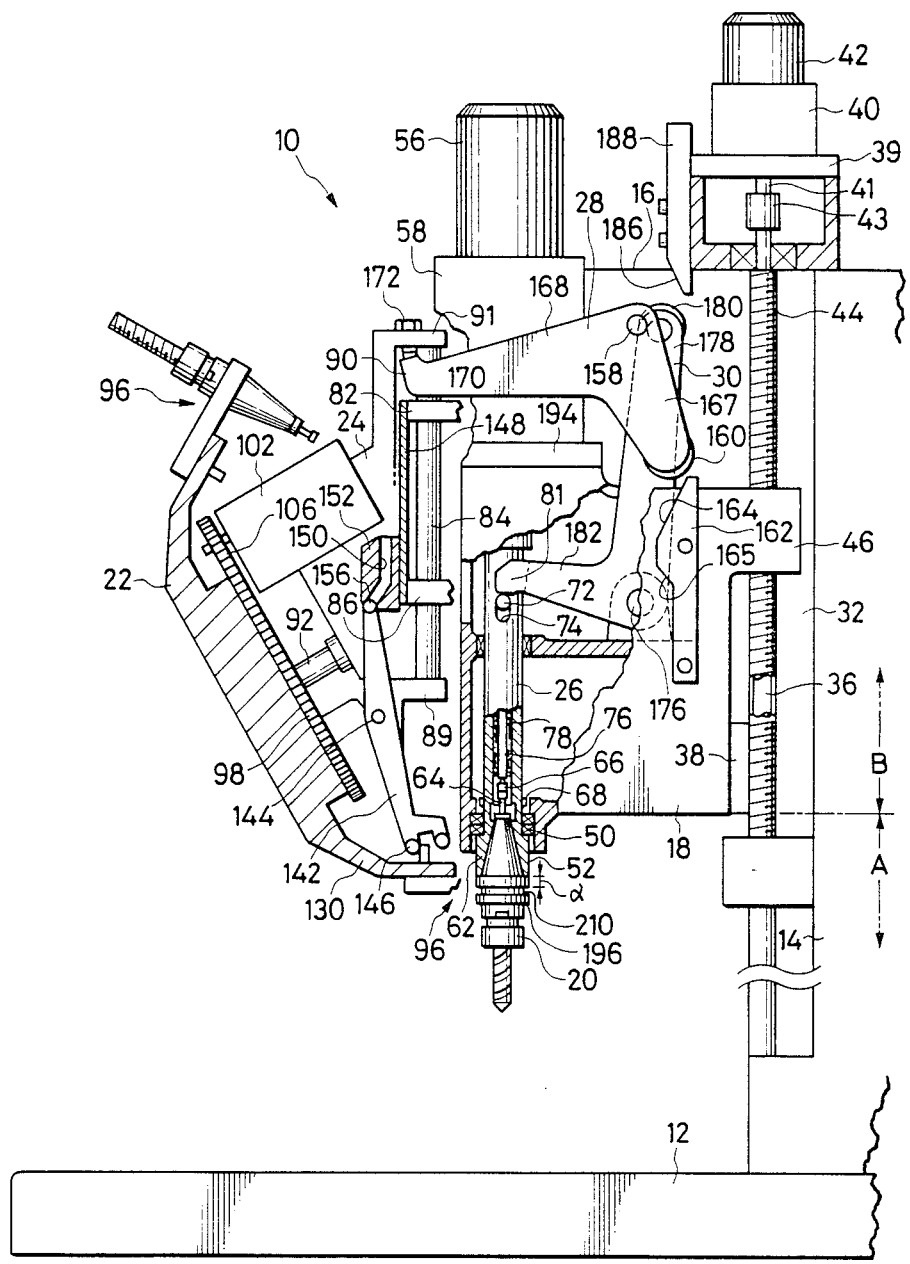
FIG. 1 is a schematic diagram illustrating the construction of the machine tool of the first embodiment of the present invention.

FIG. 1 is a schematic diagram illustrating the construction of a machine tool 10 embodying the present invention, wherein a main spindle head 18 rotatably supports a main spindle 26 with a tool mount 52 installed at one end. The main spindle head 18 is vertically moveable supported by a frame 16 so that a workpiece may be machined as desired. The tool mount 52 is equipped with a tool holding member 66 for holding a tool 20, the tool being axially detachable therefrom. A tool magazine 22, supplied with a plurality of radially arranged tool holders 96, is rotatably supported by a tool support 24. The tool support 24 is also supported by the frame 16 for vertically upward movement independent of the main spindle head 18.

There is a first cam-and-crank mechanism 162, 28 for causing the tool 20 installed at the toe of the main spindle 26 to be relatively held or released by the tool holder 96, and a second cam-and-crank mechanism 188, 30 for causing the tool 20 to be released and pulled out of the main spindle 26.

A column 14 is installed vertically on a base 12 of the machine tool 10. A rigid frame 16 made up of a box-shaped hollow casing is secured to the front of the column 14 in such a manner that it is held horizontally. A spindle head 18, rotatably supporting the spindle 26, is provided on the frame 16 in such a manner that it is movable vertically by the following means: a pair of elongated post members 32, 32' (not shown) are provided in front of the column 14 in such a manner that the post members 32, 32' are also vertically extended along the column 14. Guide rails 36, 36' (not shown) are coupled to the vertical end faces, in the longitudinal direction, of post members 32, 32', respectively, in such a manner that they are held vertically. Two pairs of right and left sliding pieces 38, 38' (not shown) spaced a predetermined distance in a vertical direction behind the spindle head 18, are slidably fitted on the guide rails 36, 36', respectively. Thus, the spindle head 18 is stably moved at all times.

Between the tops of the pair of post members 32, 32', an AC servomotor 40 containing a rotary encoder 42 is arranged on a support plate 39. A ball screw 44 is fastened to the end of the vertical rotary shaft 41 of the servomotor 40 through a coupling 43, and the ball screw 44 extends downwardly between the pair of guide rails 36, 36'. A nut 46 is horizontally fixed in the back projected portion of the main spindle head 18. The ball screw 44 is passed through and engaged with a nut 46.

When the AC servomotor 40 is activated, the ball screw 44 is rotated in the predetermined direction to cause linear movement without backlash to the nut 46. This also causes the main spindle head 18 to be freely moved in a perpendicular direction relative to the frame 16 to the extent of a predetermined stroke. That is, the AC servomotor 40, the ball screw 44, and the nut 46 engaged therewith constitute a reciprocal driving mechanism for the main spindle head 18. The vertical stroke of the main spindle head 18 is, as discussed later, roughly divided into (1) a machining region A for causing the workpiece to be machined by making a normal repetitive vertical movement and (2) an automatic tool changing region B, which is located above the A region for allowing the tool 20 to be attached to, and be detached from, the main spindle 26 through a "double action" operation.

During the aforesaid "double action" operation which is carried out within the automatic tool changing region B, the main spindle head 18 undergoes a single reciprocation wherein a used tool is extracted from the spindle and a new or different tool is inserted. As a matter of course, the main spindle head 18 shown in FIG. 1 is elevated up to the upper limit of the machining region A (or the lower limit of the automatic tool changing region B) upon completion of machining. It will remain in a standby position until the next machining or tool changing instruction is given.

The hollow cylindrical main spindle 26 is inserted into a bearing 50 and rotatable supported thereby under the main spindle head 18. The main spindle 26 has the tool mount 52 at its lower end. Its upper end is connected to a motor 56 uprightly arranged on top of the main spindle head 18 and to a reducer 58.

The tool mount 52 is designed to mount the detachable tool 20 equipped with an arbor 62 having a tapered shank, by means of a conical opening for admitting the arbor 62. A pull stud 64 is provided at the rear end of the arbor 62 of the tool 20. The tool 20 is attached to the main spindle 26 by engaging the pull stud 64 with the tool holding member 66 which is slidably inserted in the hollow main spindle 26. The tool holding member 66 is formed with a known collet arranged to encircle the neck of the pull stud 64 with a plurality of balls 68, and to clamp and release the pull stud 64 as the tool holding member 66 slides in the hollow portion of the main spindle 26.

A draw bar 76 is inserted into the spindle 26 in such a manner that it is slidable along the central axis of the spindle 26. The lower end portion of the draw bar 76 is coupled to the top of the aforementioned tool holding member 66. Elliptic slots 74, 74' (not shown) are formed in the portion of the spindle 26 which confronts the upper end of the draw bar 76 in such a manner that the slots are positioned diametrically opposite to each other. A pin 72 penetrates the upper end portion of the draw bar 76. Both end portions of the pin 72 extend horizontally outwardly through the slots 74, 74', respectively. With the tool connected to the tool mount 52, a group of compressed belleville springs 78 are elastically interposed between the step formed below the hollow of the spindle and a predetermined point on the upper end portion of the draw bar. That is, the draw bar 76 is extended along the central axis of the belleville springs. Normally, the draw bar is pushed upwardly and held in place by the belleville springs 78. The tool holding member 66 is also elastically pushed upwardly to ensure the positive holding of the pull stud 64. A two-leg fork 81, formed at the end of a second crank 30 (described later), is provided above the pin 72 extended outside the spindle in such a manner that the fork 81 is not in contact with the pin 72. As the crank 30 is operated, the pin 72 is pushed by the fork 81 so that the draw bar 76 is moved downwardly. In other words, as the pin 72 is moved downwardly by the cam operation of a second cam 188 and a second crank mechanism 30 (described later), the draw bar 76 is moved downwardly along the axis to move the tool holding member 66 downwardly. As a result, the depression of the pull stud 64 by the ball 68 is eliminated and the tool 20 can be released from the tool mount 52.

The tool support 24 which is supported by the frame 16 in such a manner that it is movable in the axial direction independently of the main spindle 26, will now be described in more detail. Support plates 82, 82' (not shown) are horizontally attached to a pair of opposite side walls (not shown) constituting the frame 16. A pair of round guide rails 84, 84' (not shown) are vertically fixed to the tool support 24 (in a manner to be described later) and are slidably inserted in a perpendicular throughhole suitably made in each of the respective horizontal support plates 82, 82'. A pair of horizontal left and right support plates 86, 86' (not shown) extend from the lower part of the frame 16. The guide rails 84, 84' are slidably inserted in the horizontal support plates 86, 86'. The upper and lower ends of each of the guide rails 84, 84' are respectively fixed to a support plate 91 which is horizontally bridged over the top of the tool support 24. A support plate 89 is installed on the bottom of the support plate 91. Accordingly, the tool support 24 can be elevated to certain heights in region B relative to the frame 16 by sliding the guide rails 84, 84' against the respective pairs of horizontal support plates 82, 86, and 82', 86' as the first cam-and-crank mechanism 162, 28 is caused to operate during the "double action" movement of the main spindle head 18. A stopper bolt 90 is fitted in the support plate 91 installed on top of the tool support 24. The height of the stopper bolt 90 is adjustable so that the tool support 24 can be held at a position having a predetermined height relative to the frame 16 when the bolt is kept stationary in the plane of the horizontal support plate 82.

The tool magazine 22 which holds many tools 20 radially arranged and which is capable of rotatingly indexing them, is supported by the tool support 24. A supporting shaft 92 having an axis diagonally downwardly inclined at a predetermined angle relative to the horizontal plane is projected from, and fixed to, the tool support 24. The tool magazine 22 is rotatably supported by the supporting shaft 92. The tool magazine 22 is a disk formed with a large diameter flat toothed wheel 98 and provided with a plurality of radially extending tool holders 96 circumferentially arranged on the outer periphery thereof. The large diameter flat wheel 98 is fixed to a bearing (not shown) and engaged with a pinion 106 fastened to the rotary shaft (not shown) of a motor 102. Motor 102, in turn, is fixed to the tool support 24. The flat wheel 98 is rotated by the motor 102 through the pinion 106 to rotate the tool magazine 22 and index a required tool 20.

Figure 7:
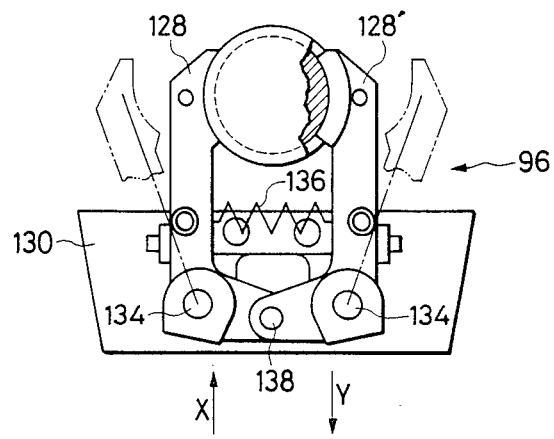
FIG. 7 is an explanatory diagram illustrating the operation of a tool holder in the first embodiment of the present invention.

The tool holder 96 arranged on the outer periphery of the tool magazine 22 will now be described. The tool holder 96 is, as shown in FIG. 7, composed of a pair of claw members 128, 128' mounted by a finger 130 to enable the claw members to simultaneously open and close. A plurality of fingers 130 are fixed in the peripheral direction of the flat wheel 98 forming the base of the tool magazine at a predetermined central angle, and extend in the radial direction. Each finger 130 is formed with a plate member bent at a predetermined angle, and the respective pair of claw members 128, 128' bent in a doglegged shape are positioned a predetermined space apart on the finger 130 to be rotatable through a predetermined angle about respective pins 134. A tension spring 136 is resiliently stretched over both the members. The claw portions of the claw members 128, 128' facing each other are activated by the crank mechanism (in a manner to be described later) and caused to open and close, whereby a grooved flange 196 formed in the tool 20 can be gripped or released. As shown in FIG. 7, the other ends of the pair of dog-leg-shaped claw members 128, 128' are connected via a shaft pin 138, which projects slightly from the rear side of the finger 130. When the shaft pin 138 in FIG. 7 is urged in the Y direction, each of claw members 128, 128' closes and holds grooved flange 196 of the tool 20. On the other hand, if the shaft pin 138 is urged in the X direction, each of claw members 128, 128' will be rotated outwardly, releasing the tool 20 (shown by dashed lines in FIG. 7). The angle (relative to wheel 98) of the finger 130, each supporting one of the tool holders 96 on the outer periphery of the tool magazine 22, is set in such a manner as to make the axis of the held tool 20 coincide with the axis of the main spindle 26 when the tool 20, held by the tool holder 96, arrives at the lower side of the tool mount 52 provided at the toe of the main spindle 26, that is, when wheel 98 is rotatingly indexed about shaft 92.

The mechanism for opening and closing the tool holder 96 will now be described. As shown in FIG. 1, a bell crank 142 having a desired shape is rotatably pivotally attached to the support plate 89 at the center thereof through a pin 144. A fork 146 is formed in the lower end of the bell crank 142, with the fork located at the position where the tool holder 96 arrives at the lower side of the main spindle 26 after the rotation of the tool magazine 22. The shaft pin 138 for selectively driving the claw members 128, 128' to open or close is set in between the legs of the fork 146.

A vertical plate 148 is arranged and fixed to the upper and lower horizontal support plates 82 and 86, respectively, attached to the frame 16. A cam 152 (provided with a bent groove 150 of a predetermined shape) is attached to the front face of a vertical plate 148. A follower pin 156 is attached to the upper end of the bell crank 142 and is slidably inserted in the bent groove 150 of the grooved cam 152. The bell crank 142 pivotally attached to the tool support 24 is caused to elevate en bloc when the tool support 24 is elevated by the first cam-and-crank mechanism 162, 28 (to be described later). The pin 156 attached to the upper end of the bell crank 142 follows the bent groove 150 of the grooved cam 152 fixed to the frame 16, and the bell crank 142 turns slightly clockwise around the pin 144. The fork 146 of the bell crank 142 thus drives the shaft pin 138 of the tool holder 96 in the direction of the Y arrow of FIG. 7 to close the pair of the claw members 128, 128'. If the bell crank 142 turns counterclockwise, the fork 146 drives the shaft pin 138 of the tool holder 96 in the direction of the X arrow and operates to open the pair of claw members 128, 128'.

There will now be described a mechanism for elevating the tool support 24 relative to the frame 16 in the automatic tool changing region B to achieve the "double action" movement of the main spindle head 18. The first crank 28 (having an L-shape) is rotatably pivotally attached to each of the internal faces of the opposite side walls (not shown) of the frame 16 through a shaft 158. The pair of first cranks 28, 28' (not shown) are arranged in the interior of the side wall respectively in opposed relation. A roller 160 is rotatably installed at the end of a short arm 167 of crank 28. First plate cams 162 are provided respectively on both sides of the spindle head 18. Each of the first plate cams 162 has a first cam surface 164 inclined in one direction and a second cam surface 165 inclined in another direction. The first plate cam 162 is installed a predetermined space apart from, and under, the roller 160 rotatably attached to the first crank 28 to locate the main spindle head 18 at the upper limit of the automatic tool changing region B. A contact 170 is fixed to the upper end face of the long arm 168 of first crank 28. Contact 170 is slightly separated from the lower end of the bolt 172 screwed into the support plate 91.

When the main spindle head 18 is elevated by turning the servomotor 40, the roller 160 of the first crank 28 abuts the first cam surface 164 of the plate cam 162 and turns the respective crank 28 clockwise around the shaft 158. The contact 170 of the long arm 168 then abuts the lower end of the bolt 172 and elevates the tool support 24 along the guide rail 84 by a predetermined stroke. If the spindle head 18 is further moved upwardly, the second cam surface 165 is abutted against the roller 160 so that the crank 28 is turned counterclockwise about the shaft 158. Therefore, the contactor 170 of the aforementioned arm 168 moves the tool supporting stand 24 downwardly along the guide rail 84 while locking the bolt 172 at the lower end. The dimensional ratio of the long arm 168 to the short arm 167 of the first crank 28 and the bent angle of both arms should be selected such that the elevated distance of the main spindle head 18 coincides with that of the tool support 24 elevated by the first cam-and-crank mechanism 162, 28 and such that their speeds are synchronized with each other.

A description will now be given of the second cam-and-crank mechanism which operates to make the tool holding member 66 provided in the tool mount 52 release the tool 20 when the main spindle head 18 and the tool support 24 are moved in another part of the "double action" motion by the first cam and crank mechanism 162, 28. An L-shaped second crank 30 is installed in the main spindle head 18 to be pivotable through a predetermined rotating angle about shaft 176. A roller 180 is rotatably attached to the toe of the long arm 178 of second crank 30 whereas the toe of a short arm 182 is formed as a fork 81. The fork 81 encloses the main spindle as it is positioned slightly above the perpendicular pin 72 inserted in the top of the draw bar 76. Fork 81 is in a non-contact state when the machine tool is in the tool release instruction receiving mode. Although the main spindle 26 is rotated by a motor 56 during machining, the angular position of the rotary shaft of the motor 56 is controlled to always stop at a fixed position. Accordingly, the pin 72 which extends perpendicularly to the main spindle 26 is also caused to stop at the fixed position directly beneath the fork 81 to ensure that the fork 81 engages pin 72 when the second crank is operated.

A second plate cam 188 having a cam surface with a predetermined inclination is arranged to cam the second crank 30 during the elevational movement of the latter component when the main spindle head is further elevated in the automatic changing region B. The second plate cam 188 is fixed to the perpendicular casing of the AC servomotor 40 attached to the top of pillar member 32 through a bolt (not shown) and it has a tilted cam surface 186 oriented perpendicularly downwardly. In operation, as the main spindle head 18 is further elevated, the roller 180, rotatably supported at the toe of the long arm 178 of the second crank 30, will be made to run on the tilted cam surface 186 of the plate cam 188. As a result, the second crank 30 is turned counterclockwise around the shaft 176 by a predetermined angle. The fork 81 provided at the toe of the short arm 182 contacts the perpendicular cross pins 72 and presses the pin 72 while forcing the draw bar 76 to drop a predetermined distance, thus lowering the tool handling member 66. Consequently, the balls attached thereto are released from the pull stud 64 and the tool 20 is released from the tool mount 52. A laminated spring (not shown) is attached to the long arm of the second crank 30. The released end of the laminated spring contacts the upright end face of a horizontal support plate 194 provided on the top of the main spindle head 18, whereby a clockwise return force is felt on the crank 30.

The operation of the first cam and crank mechanism 162, 28 always occurs prior to the operation of the second cam and crank mechanism 188, 30. As will be described in more detail later, when the main spindle head 18 is elevated a distance of about 20 mm (in this embodiment) from the basic position (i.e., the lower limit position of the automatic tool changing position B), the first crank 30 is caused to contact the first plate cam 162 and elevate the tool support 24 a corresponding distance of 20 mm. When the main spindle head 18 is elevated to a distance of 30 mm, the second crank 30 abuts the second plate cam 188. The resulting cam action pushes up the draw bar 76 and releases the pull stud 64 from the tool holding member 66.

A second embodiment of the present invention will now be described with reference to FIGS. 8–13.

Figure 12:
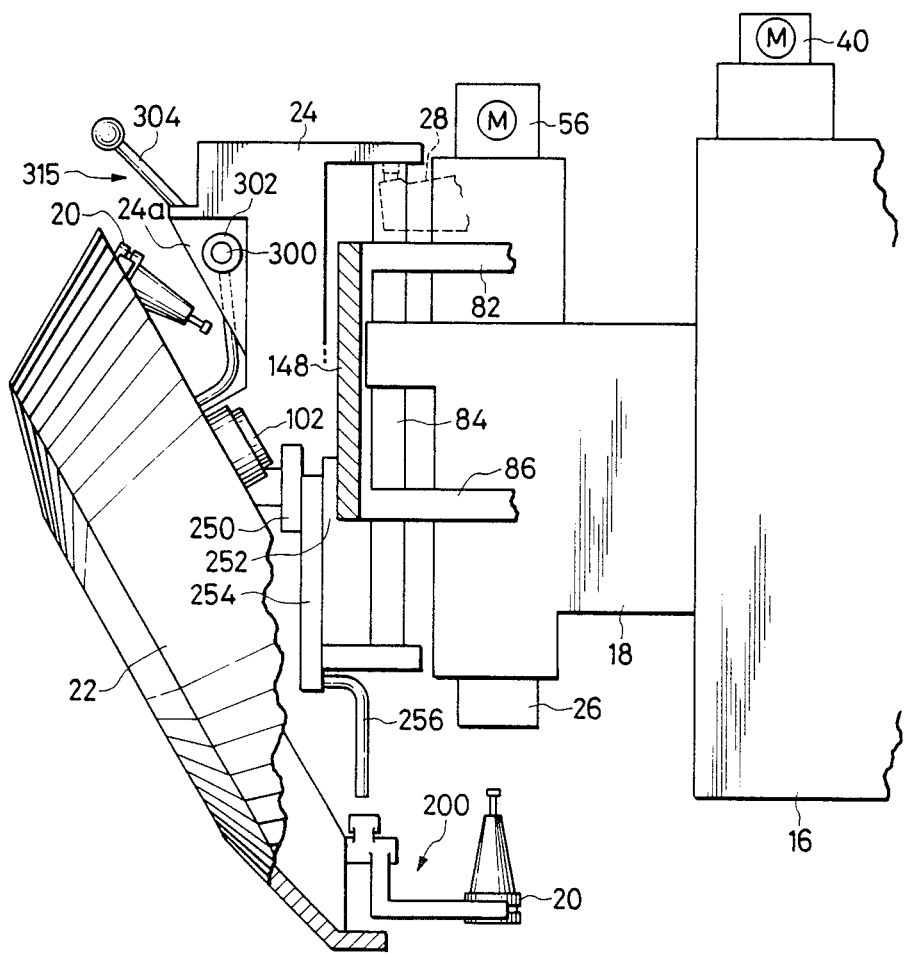
FIG. 12 is an explanatory diagram outlining the arrangement of the machine tool in the second embodiment of the present invention.

As shown in FIG. 12, in a machine tool, a spindle head 18 rotatably supporting a spindle 26 is vertically movably supported on one side of a frame 16. The spindle head 18 thus supported is moved vertically a predetermined stroke by an AC servomotor 40 mounted on the upper surface of the frame 16 and a ball thread (not shown) coupled to the motor 40. A spindle motor 56 which is rotatable in both directions is coupled to one end of the spindle and installed on the upper surface of the spindle head 18.

A pair of supporting plates 82 and 86 are provided on one side of the frame 16 in such a manner that they are laid vertically and extended horizontally. First ends of the supporting plates 82 and 86 are connected to a vertical plate 148. A vertically extended guide rail 84 slidably penetrates the upper and lower supporting plates 82 and 86. The upper and lower ends of the guide rail 84 are coupled to a substantially U-shaped tool supporting stand 24 in such a manner that the guide rail 84 is embraced by the tool support 24. Furthermore, the tool support 24 is so designed that, with respect to the frame 16, it is moved vertically by the cam (not shown) and the crank 28 which are operated by the vertical movement of the spindle head 18.

On one side of the tool support 24, a tool magazine 22 adapted to hold a plurality of tools 20 is provided in such a manner that it is rotatable around the axis which is inclined with respect to the axis of the spindle 26. The tool magazine 22 thus provided is rotatably indexed by a motor 102 mounted on the tool support stand 24. The spindle head 18 and the tool support 24 operate as disclosed by Japanese patent application (OPI) No. 155338/1985 (the term "OPI" as used herein meaning "an unexamined published application.")

Pairs of substantially L-shaped fingers 200 are radially provided on the periphery of the tool magazine 22. A substantially L-shaped bell crank 250 (described in FIG. 13), which is rotatable about its central part 251, is supported on the tool support 24. The bell crank 250 has one end engaged with the cam surface of a cam 252 provided on one side of the vertical plate 148, and the other end engaged with the upper end portion of a shift bar 254. The lower end of the shift bar 254 is coupled to a substantially L-shaped finger releasing rod 256 which is extended towards the fingers 200 which hold the tool 20 which has been indexed below the spindle 26.

Figure 8:
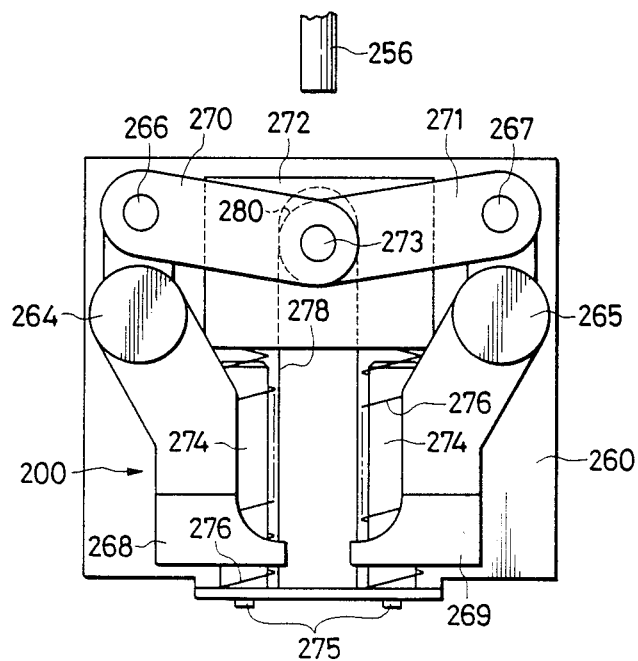
FIG. 8 is an enlarged front view of the fingers in the second embodiment of the present invention.

As shown in FIGS. 8 through 10, the fingers 200 have cylindrical base end portions 262 and 263 substantially at the middles, respectively. At the base end portions 262 and 263, the fingers 200 are rotatably mounted on fulcrum shafts 264 and 265 with threaded shafts 264a which are screwed through a substantially L-shaped plate 260 into the peripheral portion of the tool magazine 22. On the upper surfaces of the base end portions 262 and 263, cylindrical flanges 284 and 285, which are smaller in diameter than the base end portions 262 and 263, are formed, respectively. Below the base end portions 262, 263, substantially L-shaped clamping pawls 268 and 269 are formed. The clamping pawls 268 and 269 are extended towards the frame 16, to clamp the grooved flange 196 of the tool 20.

Pins 266 and 267 are rotatably inserted into the flanges 284 and 285, respectively. First end portions of a pair of first links 270 are rotatably coupled to both ends of the left pin 266 (FIG. 8), respectively. Similarly, first end portions of a pair of second links 271 are rotatably coupled to both ends of the right pin 267, respectively. The remaining end portions of these first and second links 270, 271 are rotatably mounted on a pin 273 at the substantially central part of a box-shaped spring receiver 272 which is disposed between these links 270 and 271.

Two guide rods 274 extending upwardly are secured to the lower part of the supporting plate 260 with screws 275. A pair of coil springs 276 are wound on respective guide rods 274. The coil springs 276 are extended more upwardly than the guide rods 274 and are inserted in the spring receiving portions (not shown) of the afore-mentioned spring receiver 272.

A guide groove 278 is formed in the supporting plate 267 in such a manner that it is extended along the vertical central axis of the supporting plate 260. The guide groove 278 is engaged with a bearing 280 which is rotatably mounted on one end portion of the pin 273, so that the spring receiver 272 is held horizontal.

On one side of the tool supporting stand 24, flanges 24a are extended respectively from both ends of the tool support 24 toward the tool magazine 22. The flanges 24a support a tool releasing member 15 which is used to release the tool 20 from the fingers 200. A supporting rod 300 is rotatably inserted into the flanges 24a in such a manner that the axis of the supporting rod 300 is perpendicular to the axis of the spindle 26. Collars 302 are fixedly mounted on respective end portions of the supporting rod 300 to prevent horizontal movement of the supporting rod.

An operating lever 304 is fixedly secured to one end of the supporting rod 300 in such a manner that, outside of the tool support 24, it is extended perpendicular to the axis of the tool support 24. A supporting member 308 with a depressing lever 306 is put on the substantially middle portion of the supporting rod 300 and is secured thereto with a screw 310. The depressing lever 306 is extended in a direction perpendicular to the axis of the supporting rod 300, that is, it is extended towards the fingers 200.

The operation of the first embodiment of the machine tool of the present invention will now be described. In FIG. 1, after the main spindle 18 completes normal cutting operation, it returns to the standby position in the machining region and stops. At this point, the main spindle 26 is in a position where the pin 72 crosses the short arm 182 of the second crank 30. If the next instructions are such that cutting operation should be continued, the main spindle head 18 will enter the machining region A to machine the work piece. If, however, the instructions relate to tool changing, the main spindle head 18 will undergo a "double action" movement and enter the automatic tool changing region B (to be described later). Referring now to FIG. 1, because the shaft pin 138 of the tool holder 96 is pressed and held in the Y direction of FIG. 7 by the fork 146 of the bell crank 142, the claw members 128, 128' are opened and the tool 20 is released. The crest groove 210 formed in the flange 196 of the tool 20 and held by the claw members 128, 128' is located lower than claw members 128, 128' by a distance ("alpha") and, without means for compensating for this offset, the tool 20 cannot be held at the fixed position even if both the claw members 128, 128' are closed. However, as the main spindle head 18 is elevated and while it moves from the position in FIG. 1 to that shown in FIG. 2, the first plate cam 162 moves and covers of distance of "alpha" until it abuts on the roller 160 installed on the first crank 28. This compensates for the crest groove 210 being positioned under the claw members 128, 128' by the distance of "alpha."

Figure 2:
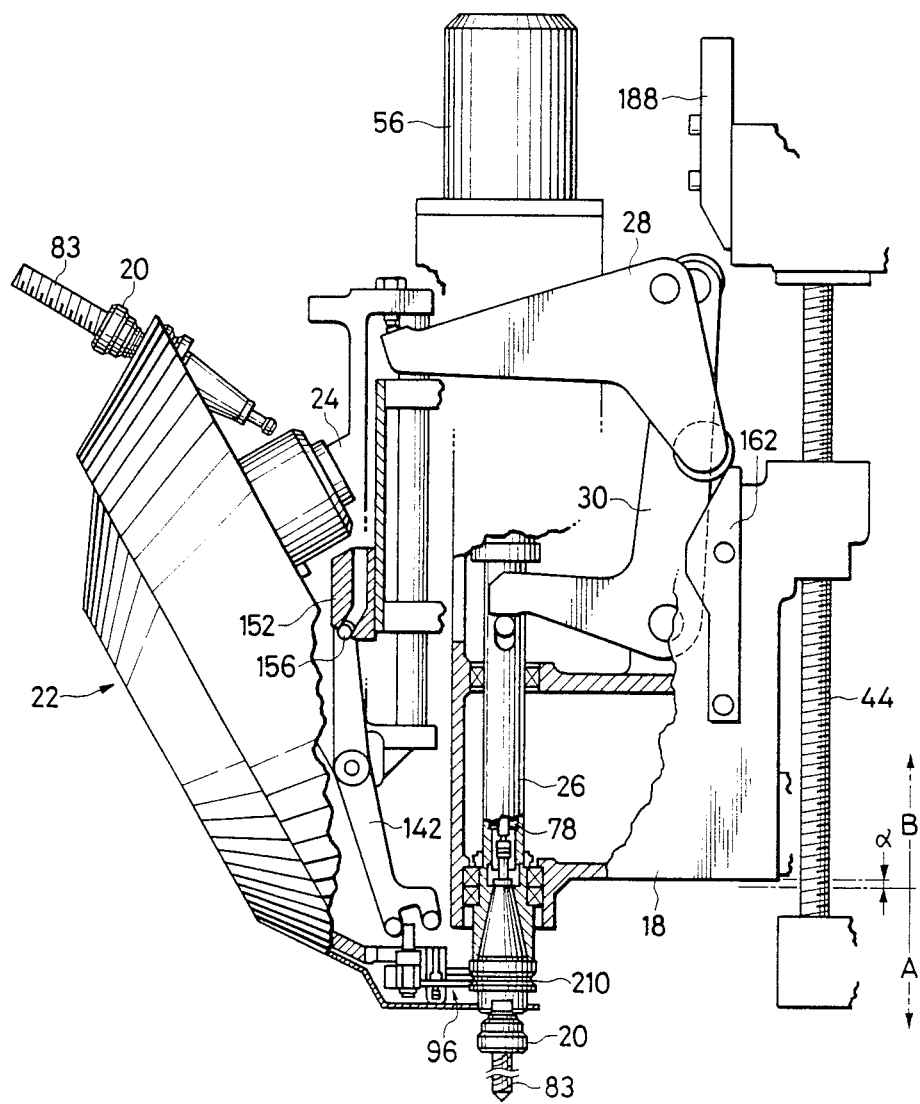
FIGS. 2-6 are explanatory diagrams illustrating the operation of the first embodiment of the present invention.
Figure 3:
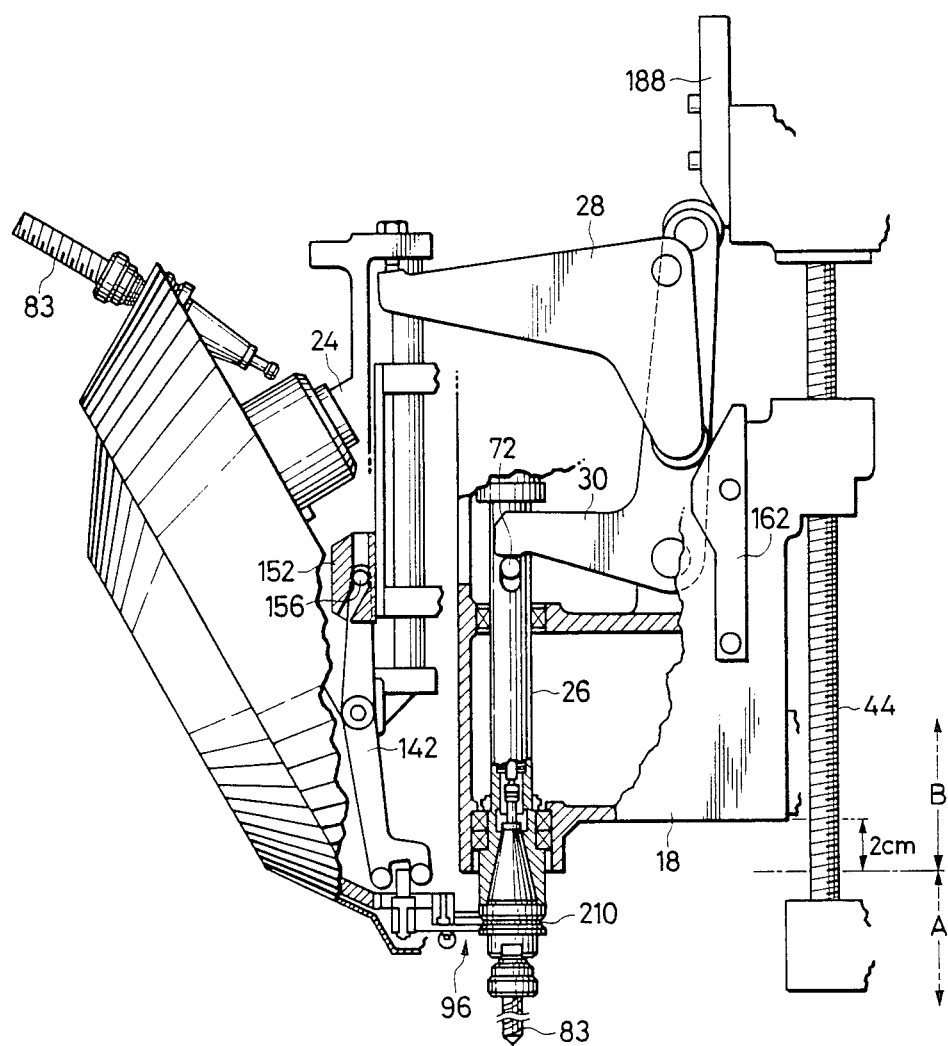

When the instructions as to tool changing are given by the machine tool in the state as shown in FIG. 1, the AC servomotor 40 is driven to turn the ball screw 44; and the main spindle head 18 is vertically elevated up to the automatic tool changing region B. The main spindle head 18 undergoes the first stage of the "double action" as depicted in FIGS. 2 and 3. That is, the main spindle head 18 at the position shown in FIG. 2 has been independently elevated by the distance "alpha" for reasons explained previously. The first plate cam 162 is then caused to abut on the roller 160 of the first crank 28. Then contact 170, installed on the long arm 168 of the crank 28, engages the lower end of bolt 172 provided on the support plate 91 of the tool support 24. At this time, the AC servomotor 40 is controlled to rotate at a very low speed in order to reduce the noise generated by the contact 170 touching the bolt 172. After this time, the AC servomotor 40 operates at the predetermined speed.

As shown in FIG. 3, the main spindle head 18 is elevated a distance of, for instance, 20 mm. During the elevation from FIG. 2 to FIG. 3, the first crank 28 is further turned because of the cam operation associated with the first plate cam 162. This causes the tool support 24 together with the main spindle head 18 to elevate through essentially the same distance, in this case 20 mm. As the tool support 24 is elevated, the bell crank 142 pivotally attached to the upper end thereof follows the bent groove 150 of the groove cam 152. Accordingly, the bell crank 142 then drives the shaft pin 138 of the tool holder 96 in the direction of the Y arrow of FIG. 7, closing the pair of claw members 128, 128' to grip flange 196 of tool 20.

Figure 4:
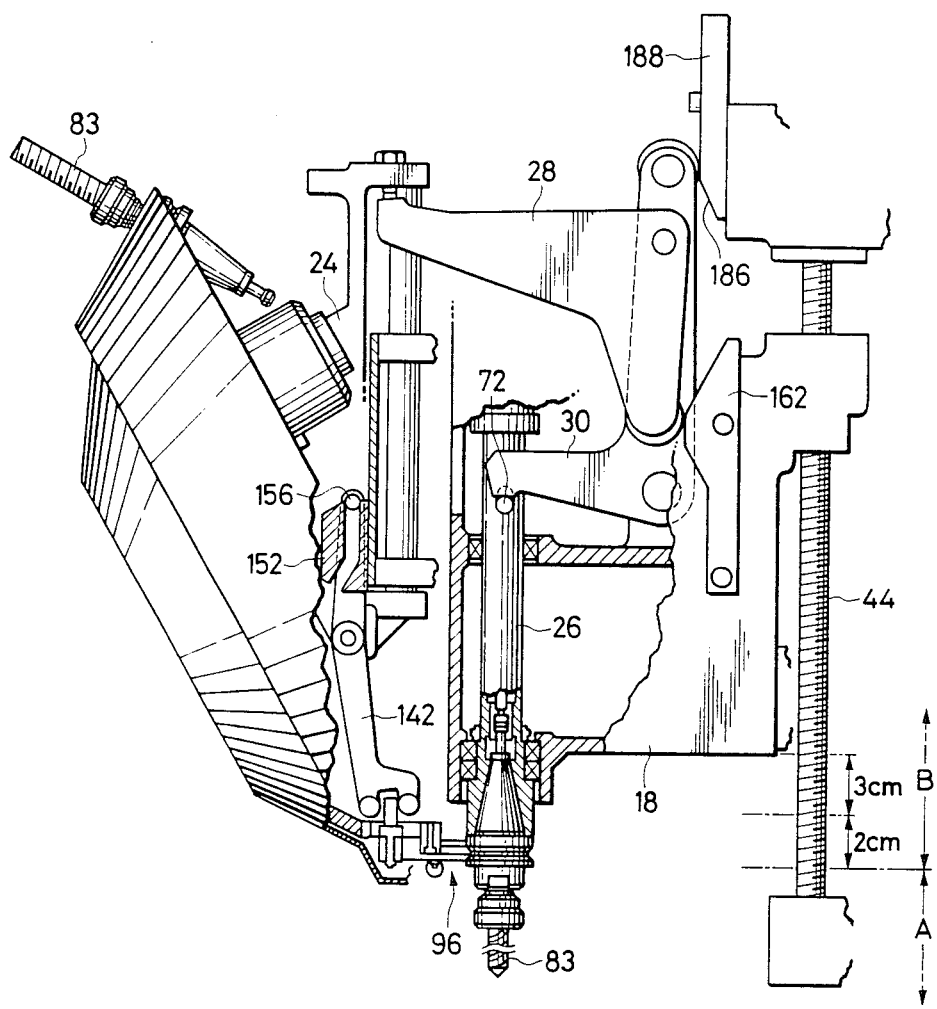

The main spindle head 18 then undergoes the second stage of the "double action" motion to the position shown in FIG. 4. During this second stage, because the roller 160 of the first crank 28 abuts the tilted cam surface 164 of the first plate cam 162, the tool support 24, together with the main spindle head 18, is elevated a greater distance, for instance, 30 mm in this case. As the main spindle head 18 undergoes the second stage of the "double action" motion, the roller 180 installed on the long arm 179 of the second crank abuts the second plate cam 188 located at the upper fixed position. This causes crank 30 to be turned counterclockwise around the shaft 176. The fork 81 provided at the end of the short arm 182 then contacts and depresses the perpendicular cross pin 72. As a result, the balls are released from the pull stud 64 of the tool 20. The tool is released from the tool mount 52 at the toe of the main spindle 26. As mentioned previously, the tool 20 is still held by the tool holder 96 installed on the tool magazine and, therefore, the released tool 20 is prevented from dropping. Although the bell crank 142 attached to the tool support 24 is elevated relative to the groove cam 152 fixed to the frame 16, the bell crank does not undergo a camming operation because the follower pin 144 has already passed the tilted portion of the bent groove 150 and is located in the groove portion which is in parallel with the axis of the main spindle 26.

Figure 5:
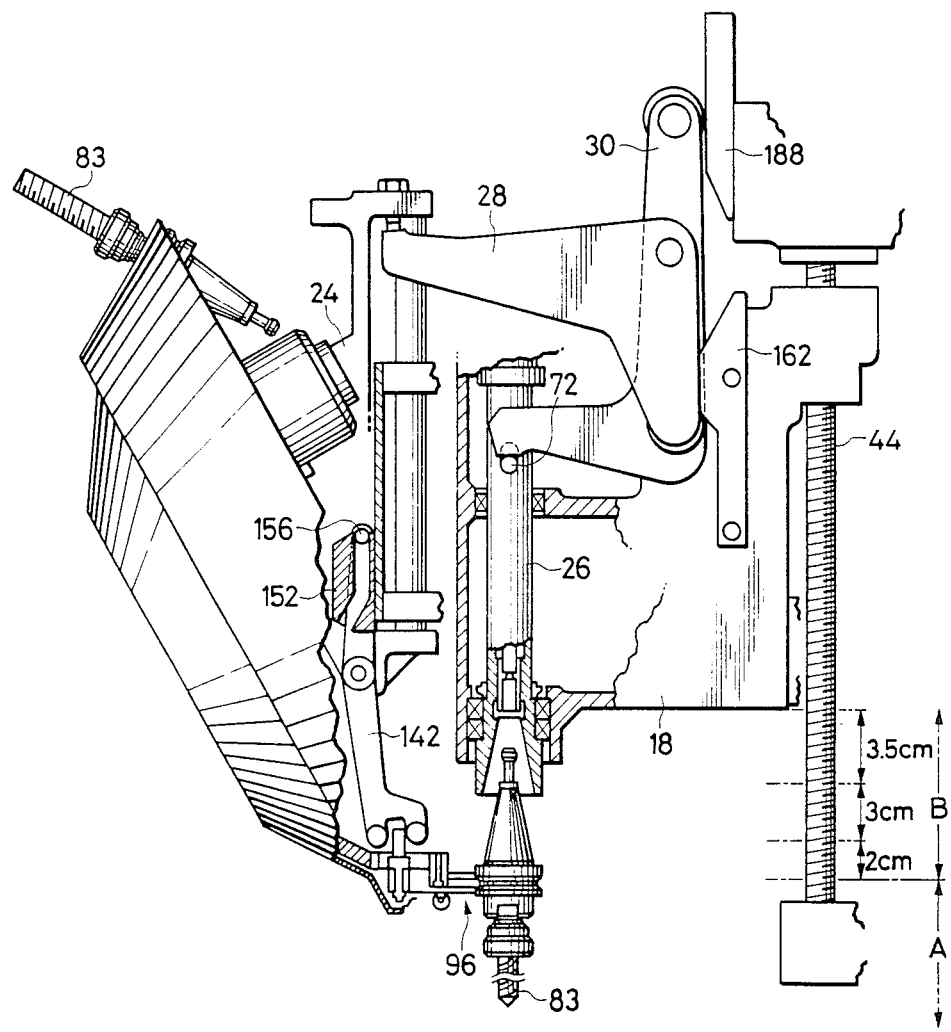

The main spindle head 18 subsequently undergoes a third stage of the "double action" motion of the present invention to the position shown in FIG. 5. In the third stage, spindle head 18 is elevated a still greater distance, for instance, 35 mm in the present case. During the upper movement, the roller 160 of the first crank 28, being engaged with the second cam surface 165 of the first plate cam 162, is rotated, so that the crank 28 is turned counterclockwise about the shaft 158. Therefore, while the spindle head 18 is further moved upwardly, the tool support 24 is moved 25 mm downwardly. The roller 180 of the second crank 30 runs on the flat face of the plate cam 188, resulting in no camming action of crank 30. The draw bar 76 is kept pressed down to maintain the pull stud 64 in a release mode. Because the tool 20 is being held at the fixed position by the tool holder 96, the arbor 62 of the tool 20 is pulled out of the tool mount 52 at the toe of the main spindle 26 as spindle head 18 is elevated and tool support 24 is lowered.

Figure 6:
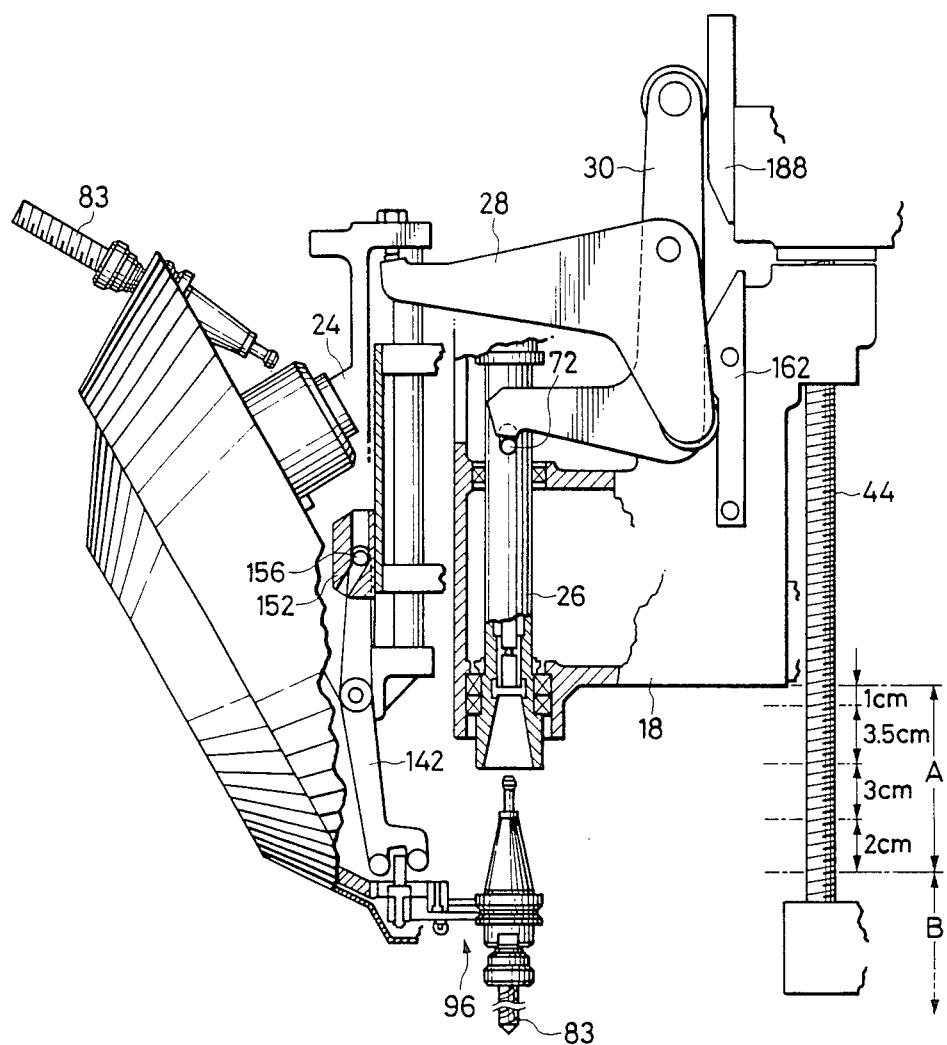

Next, the spindle head 18 undergoes the fourth operation, i.e., a "return" operation as shown in FIG. 6. That is, the spindle head 18 is moved, for instance, 10 mm upwardly. In this operation, the roller 160 of the first crank 28 is held on the flat surface of the first plate cam 162, and therefore the cam operation is not carried out. Accordingly, with the tool support 24 held at the predetermined position, only the spindle head 18 is moved upwardly. The spindle head 18 is stopped above the pull stud 64 of the tool 20 held by the tool holder 96.

Subsequently, the motor 102 in the tool magazine 22 rotatingly indexes the extracted tool 20 away from the tool mount 52. Thus, a new or different tool 20' will arrive at the position under the tool mount 52 and stop in axial alignment with spindle head 18. Then, the steps of the above described operation depicted in FIGS. 2 through 6 are repeated, but in reverse order, to complete the "double action" and to replace the tool automatically. That is, the main spindle head 18 is lowered by 45 mm and the arbor 62 of the replacement tool is mounted on the tool mount 52. Spindle head 18 is then further lowered by 30 mm to release the second crank 30 from pressing the draw bar 76. The tool holding member 66 is caused to engage the pull stud 64 of the replacement tool 20' under action of the belleville springs 78. As the main spindle head 18 and the tool support 24 are subsequently lowered by 20 mm, the bell crank 142 operates in reverse to press the shaft pin 138 of the tool holder 96 in the X direction of FIG. 7 to open claw members 128, whereby the replacement tool is released from the tool support 24.

The operation of the second embodiment of the machine tool will now be described with reference to FIGS. 8–13.

As depicted in FIG. 12, the spindle head 18 is moved vertically to a predetermined position as described in the specification of Japanese patent application (OPI) No. 155338/1985, and the tool magazine 22 is turned by the motor 102 so that a predetermined tool 20 held by the fingers 200 is positioned below the spindle 26. Thereafter, with the tool magazine 22 held in place, the spindle head 18 is moved downwardly so that the tool 20 is coupled to the lower end of the spindle 26.

Figure 13:
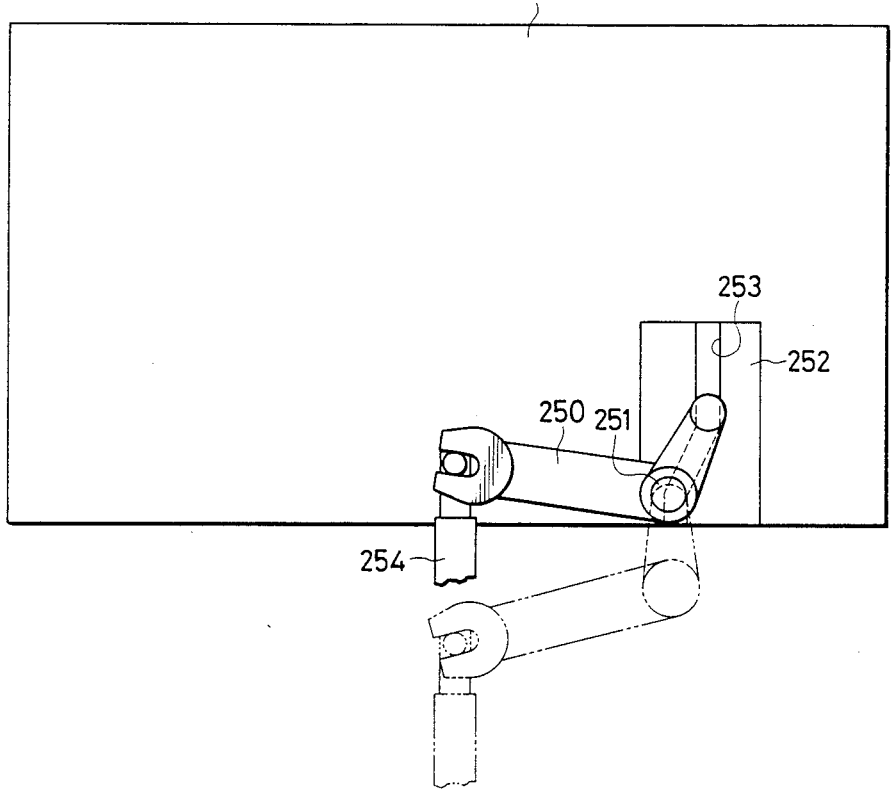
FIG. 13 is an explanatory diagram for a description of the operation of a bell crank in the second embodiment of the present invention.
Figure 14:
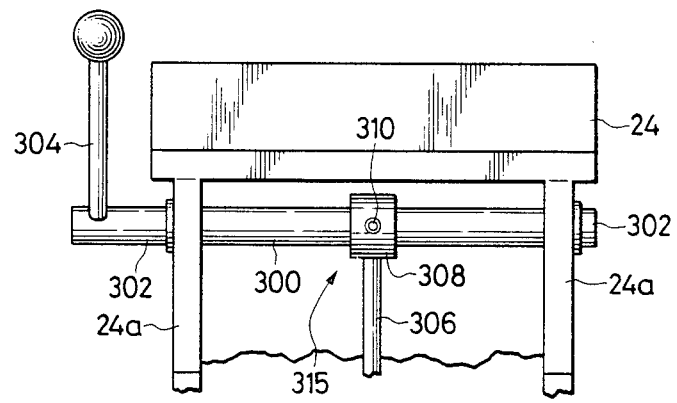
FIG. 14 is an explanatory diagram showing a tool releasing member in the second embodiment of the present invention.

Under this condition, the spindle head 18 is moved a predetermined distance downwardly. In this operation, the tool magazine 22 is also moved downwardly together with the spindle head 18. As the tool magazine is moved downwardly in this manner, the bell crank 250 is turned from the position indicated by the solid line to the position indicated by the two-dot chain line by the action of the cam 252, so that the shift bar 254 is moved a predetermined distance downwardly. This sequence is shown in FIG. 13.

As the shift bar 254 is moved downwardly, the finger releasing rod 256 is also moved downwardly. As a result, the lower end of the rod 256 is abutted against the upper surface of the spring receiver 272. Therefore, the spring receiver 272 is moved down the guide groove 278 against the elastic forces of the springs 276 (FIG. 8).

In this operation, the pin 273 is also moved downwardly and, therefore, the first links 270 are turned clockwise while the second links 271 are turned counterclockwise.

As the first and second links 270 and 271 turn as described above, with the aid of the pins 266 and 267, the flange 284 is turned clockwise about the fulcrum shaft 264 while the flange 285 is turned counterclockwise about the fulcrum shaft 265 (FIG. 10). Accordingly, the clamping pawls 268 and 269 are turned to release the tool 20 from the fingers 200.

Under this condition, the spindle head 18 is passed through the gap between the clamping pulls 268 and 269 which have released the tool 20, that is, the spindle head 18 is moved a predetermined distance downwardly and the workpiece is machined.

After the workpiece has been machined, the tool 20 can be automatically replaced by reversing the order of the abovedescribed operating steps.

After a series of machining operations has been given to the workpiece, it may be necessary to exchange the tools 20 in the tool magazine 22 for new or different tools depending on the wear of the tools or the condition of the machined workpiece. This tool exchanging operation of the second embodiment will now be described.

After the operation mode of a numerical control device (not shown) coupled to the machine tool is switched over to the manual mode, the tool magazine 22 is turned so that a tool 20 to be taken out is indexed at the tool taking position provided in the upper portion of the tool magazine (FIG. 12).

Figure 11A:
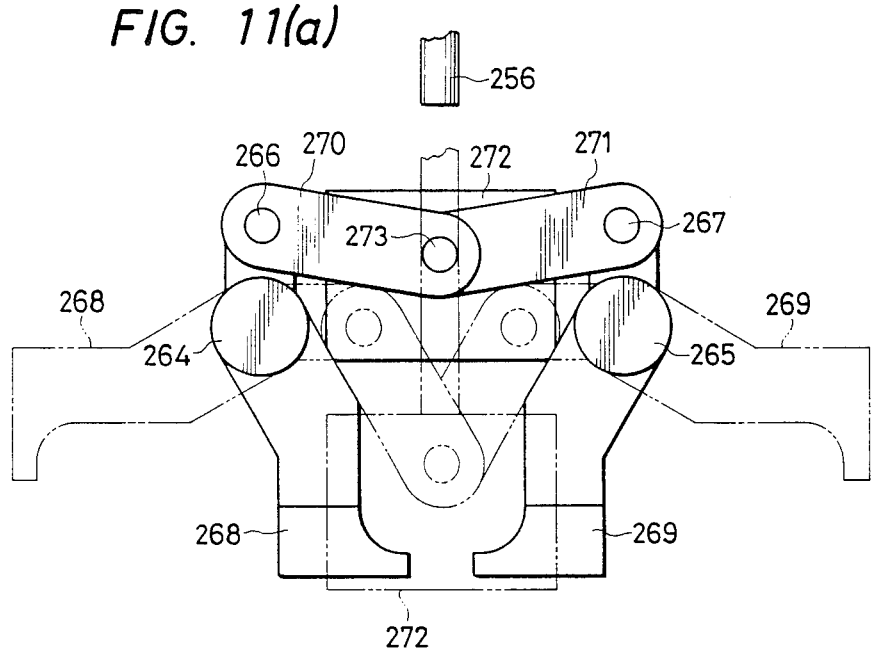
FIGS. 11(a) and 11(b) are explanatory diagrams for a description of the operation of the fingers in the second embodiment of the present invention.
Figure 11B:
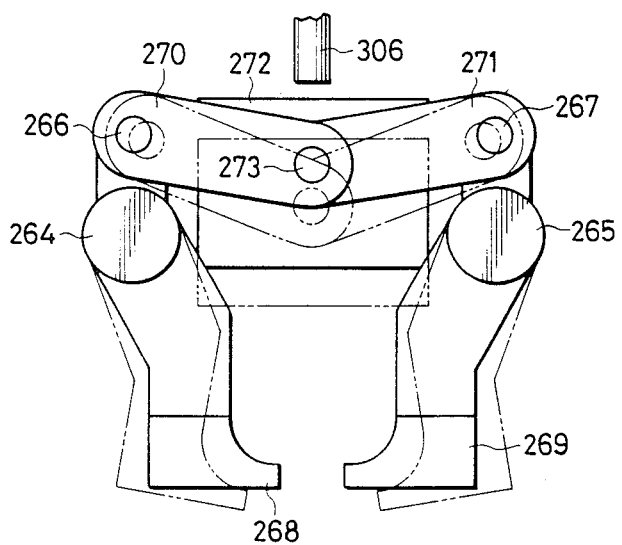
Figure 15:
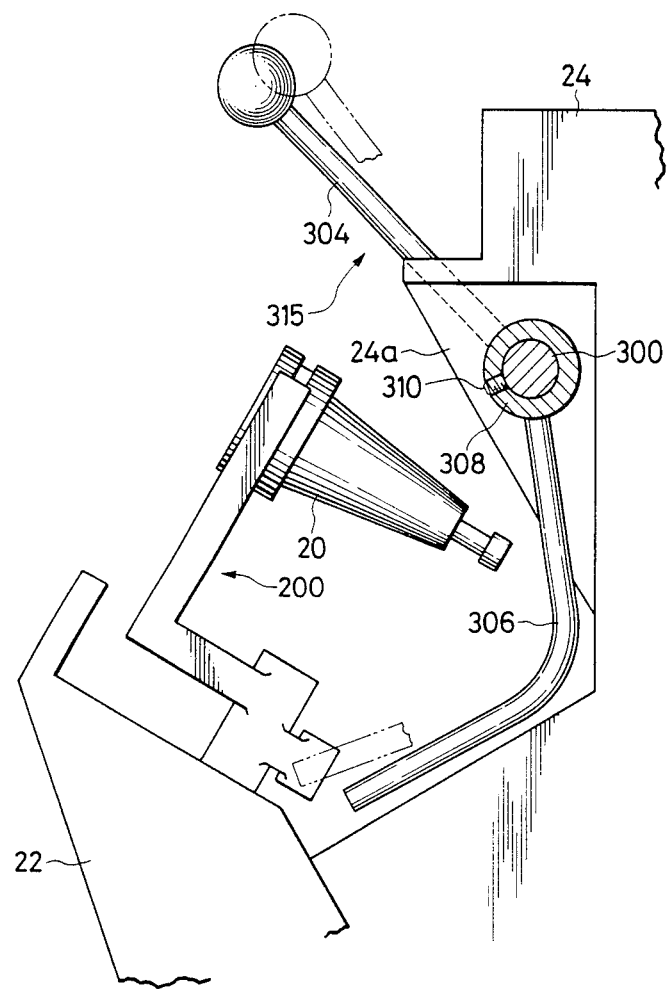
FIG. 15 is an explanatory diagram showing the operation of the tool releasing member in the second embodiment of the present invention.

Under this condition, as shown in FIG. 15, the operator holds the tool 20 and turns the operating lever 304 clockwise from the non-action position indicated by the solid line to the action position indicated by the two-dot chain line. Therefore, the supporting rod 300 is turned clockwise while the depressing part 306 is moved from the non-action position indicated by the solid line to the action position indicated by the two-dot chain line. As shown in FIG. 11(b), the end of the depressing part 306 is abutted against the upper surface of the aforementioned spring receiver 272, and the spring receiver 272 is, therefore, moved downwardly against the elastic forces of the springs 276. As the spring receiver is moved downwardly in this manner, the links 270 and 271 and the clamping pawls 268 and 269 are moved from the tool holding position (indicated by the solid lines) to the tool releasing position (indicated by the two-dot chain lines), so that the tool 20 is released from the clamping pawls 268 and 269, that is, the tool 20 can be readily removed from the tool magazine 22.

In order to mount a new tool 20, the operating lever 304 is operated to move the clamping pawls 268 and 269 so that the clamping pawls hold the new tool 20.

As set forth above, in the machine tool according to the present invention, the spindle head and the tool support are moved in opposite directions in the tool exchanging region during the tool exchanging process. Therefore, the movement of the spindle head can be decreased and, accordingly, the size of the machine tool can be decreased. Further, a tool is held in a substantially perpendicular direction to the axes of finger rotation. Thus, the fingers can release the tool without interfering with adjacent fingers. Further yet, a tool taking device is provided on the tool support so that a tool can be readily and safely taken out of the tool magazine.

What is claimed is:

1. A machine tool for machining a workpiece, the machine tool of the type having a main spindle head rotatably supporting a main spindle with a tool mount at one end, the spindle head being reciprocal relative to the machine tool frame in the axial direction of the main spindle, the machine tool further comprising:
   a tool holding member installed in the tool mount of said main spindle;
   automatic means for changing a tool held in said tool holding member during "double action" reciprocal tool-changing movement of said spindle head, said automatic means including:
   a. a tool support carried on said frame and movable in the axial direction of said main spindle independently of said main spindle;
   b. a tool magazine rotatably supported on, and axially movable with, said tool support, said magazine having a plurality of tool holders each capable of detachably holding a tool, and spaced about the magazine periphery, said magazine for indexing a selected tool holder into and out of axial alignment with said main spindle;
   c. a first cam-and-crank means interconnecting said main spindle head, said frame, and said tool support for moving said tool support together with said spindle head a predetermined distance during the "double action" movement of said main spindle head relative to said frame, the tool being held in said main spindle also being engaged to be held by one of said plurality of tool holders of said tool magazine during movement in said predetermined distance, said first cam-and-crank means also for moving said tool support and said spindle head away from each other by a predetermined distance during the "double action" movement;
   d. a second cam-and-crank means interconnecting said main spindle head and said frame for causing said tool holding member to release said tool from said tool holding member during a preselected portion of said "double action" movement; and
   e. means for preventing movement of said tool support below a fixed axial location, said spindle head being axially movable below said fixed location for performing machining operations.

2. A machine tool as recited in claim 1, wherein the first cam-and-crank means includes a crank mechanism and a cam, said cam having a first cam surface cooperating with said crank mechanism to move the tool support with the spindle head and a second cam surface cooperating with said crank mechanism to move said tool support and said spindle head away from each other.

3. A tool holding device for a machine tool in which a plurality of tools are held in a tool magazine, comprising:
- a pair of substantially L-shaped fingers, each of said pair of fingers being substantially L-shaped with a base end portion rotatably supported on said tool magazine and a free end portion formed into a clamping pawl;
- said pair of fingers having a tool holding position wherein said clamping pawls hold a tool in a substantially perpendicular direction to the axes of finger rotation and a tool releasing position wherein said clamping pawls release said tool, each of said fingers rotating about an axis perpendicular to the axis of the tool held in the tool magazine to move between the tool holding and tool releasing positions; and
- finger operating means for moving said fingers to said tool holding position and said tool releasing position.

4. A tool holding device as recited in claim 3, wherein the pair of fingers are coupled to each other through pairs of links.

5. A tool holding device as recited in claim 3, wherein the finger operating means is moved in a direction perpendicular to the axes of finger rotation.

6. A tool taking device for a machine tool having a tool support supporting a tool magazine in which a plurality of tools are held in a plurality of tool holders having fingers, said tool holders located on said tool magazine, comprising:
- a support member rotatably supported on said tool support;
- a depressing lever extending from said support member toward said fingers, said depressing member being operable to abut against said fingers; and
- an operating member coupled to said support member located outside the periphery of said tool magazine, said operating member operable to cause said depressing member to abut said fingers and move said fingers to a tool releasing position.

7. A machine tool for machining a workpiece, the machine tool of the type having a main spindle head rotatably supporting a main spindle with a tool mount at one end, the spindle head being reciprocal relative to the machine tool frame in the axial direction of the main spindle, the machine tool further comprising:
- a tool magazine reciprocal relative to the frame in the axial direction of the main spindle, said tool magazine including an outer peripheral surface;
- a plurality of tool holders supported on said outer peripheral surface of said tool magazine, each of said tool holders being movable between a holding position wherein said tool holder holds a tool and a releasing position wherein said tool holder releases the tool, said tool magazine for indexing a tool held by a selected tool holder at a position in axial alignment with said main spindle;
- first operating means for moving a selected tool holder between said holding and releasing positions; and
- second operating means for moving said tool magazine in a first direction while said main spindle head moves in a second direction, said first and second directions being in opposite axial directions relative to said frame, the selected tool holder being in the releasing position while said tool magazine moves in said first direction.

8. The machine tool as recited in claim 7, further comprising a tool support being reciprocal relative to the frame in the axial direction of the main spindle, the tool magazine being rotatably supported on said tool support.

9. The machine tool as recited in claim 7, wherein the first operating means includes a crank mechanism and a cam.

10. The machine tool as recited in claim 7, wherein the second operating means includes a crank mechanism and a cam.

11. A method of changing a tool held in a tool holding member of a machine tool spindle head, the spindle head being reciprocal in the axial direction relative to the machine tool frame, a plurality of tool holding members being disposed on a tool magazine, the tool magazine being reciprocal in the axial direction relative to the frame independently of the spindle head, the method comprising the steps of:
- a. elevating the spindle head a first predetermined distance, said first elevating step including the step of engaging and holding the tool with one of the tool holders during the relative motion between the spindle head and the frame;
- b. elevating the spindle head a second distance beyond the first distance, said second elevating step including the step of disengaging the tool from the tool holding member during the relative movement between the spindle head and the frame while continuing to hold the tool;
- c. elevating the spindle head a third distance beyond said second distance while lowering the tool magazine to separate the tool from the spindle head;
- d. replacing the tool with a replacement tool, said replacing step including performing steps a–c in reverse order to mount the replacement tool in the tool holding member; and
- e. stopping downward movement of the tool megazine at a position above a machining region, the spindle head being movable downwardly into the machining region.

12. The method as recited in claim 11, wherein the replacing step includes the steps of rotatably indexing the tool out of axial alignment with the spindle and indexing the replacement tool into axial alignment with the spindle, said rotatable indexing occurring about an axis angled relative to the spindle head axis.

* * * * *